United States Patent
Tan et al.

(10) Patent No.: US 10,460,233 B2
(45) Date of Patent: Oct. 29, 2019

(54) SELF-ADAPTIVE NEURAL NETWORKS

(71) Applicant: FUJITSU LIMITED, Kawasaki-shi, Kanagawa (JP)

(72) Inventors: Xuan Tan, Sunnyvale, CA (US); Nikola Nedovic, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 538 days.

(21) Appl. No.: 15/222,863

(22) Filed: Jul. 28, 2016

(65) Prior Publication Data
US 2018/0032860 A1 Feb. 1, 2018

(51) Int. Cl.
*G06N 3/08* (2006.01)
*G06N 3/04* (2006.01)

(52) U.S. Cl.
CPC ............... *G06N 3/08* (2013.01); *G06N 3/04* (2013.01); *G06N 3/084* (2013.01)

(58) Field of Classification Search
CPC ............ G06N 3/02; G06N 7/005; G06N 3/08; G06N 99/005; G06N 5/046; G06N 3/0427; G06N 5/047; G06N 5/04; G06N 3/0454; G06N 3/0445; G06N 3/063; G06N 3/084; G06N 3/088; G06N 3/126; G06N 5/003; G06N 5/022; G06N 5/027; G06N 5/045; G06N 99/002
See application file for complete search history.

(56) References Cited

PUBLICATIONS

Song Han, Huizi Mao, William J. Dally, Deep Compression: Compressing Deep Neural Networks with Pruning, Trained Quantization and Huffman Coding; Accessed Feb. 2016, ICLR, p. 1-14.*
"Compression Neural Network with the Hashing Trick", Wenlin Chen etc. Apr. 19, 2015.
"Compressing Deep Convolutional Networks Using Vector Quantization", Yunchao Gong etc, Dec. 12, 2015.
"Deep Compression Compressing Deep Neural Network with Pruning, Trained Quantization and Huffman Coding", Stanford U, Nvidia, 2015.
U.S. Appl. No. 15/145,664, filed May 3, 2016.
U.S. Appl. No. 15/062,067, filed Mar. 5, 2016.
Han Song, et al. (Jun. 18, 2016). "EIE: Efficient Inference Engine on Compressed Deep Neural Network". ISCA, IEEE, US. p. 243-254.
Yunchao Gong, et al. (Dec. 18, 2014). "Compressing Deep Convolutional Networks Using Vector Quantization". p. 1-10. Accessed from http://arxiv.org/pdf/1412.6115v1.pdf.
Shaohui Lin, et al. (Jul. 15, 2016). "Towards Convolutional Neural Networks Compression via Global Error Reconstruction". IJCAI-16. vol. 4, p. 554-560.

(Continued)

*Primary Examiner* — Eric Nilsson
*Assistant Examiner* — Charles C Kuo
(74) *Attorney, Agent, or Firm* — Maschoff Brennan (57) ABSTRACT

A method of updating a neural network may be provided. A method may include computing gradients for an operating matrix of a current layer of the neural network based on data of at least one of the current layer and at least one other layer of the neural network. The method may also include updating the operating matrix based on the computed gradients. Further, the method may include updating an indexing matrix of the current layer based on the updated operating matrix.

20 Claims, 8 Drawing Sheets

(56) References Cited

PUBLICATIONS

Song Han, et al. (Feb. 15, 2016). "Deep Compression: Compressing Deep Neural Networks with Pruning, Trained Quantization and Huffman Coding". ICLR. p. 1-14. Access from http://arxiv.org/pdf/1510.00149v5.pdf.

European Search Report dated Aug. 2, 2017 in application No. 17150148.9.

EP Office Action in application No. 17 150 148.9 dated Oct. 1, 2018.

* cited by examiner

SELF-ADAPTIVE NEURAL NETWORKS

FIELD

The embodiments discussed herein relate to neural networks and, more specifically, to dictionary-based, self-adaptive neural networks.

BACKGROUND

Neural network analysis may include models of analysis inspired by biological neural networks attempting to model high-level abstractions through multiple processing layers. However, neural network analysis may consume large amounts of computing and/or network resources.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method of updating a neural network. The method may include computing gradients for an operating matrix of a current layer of the neural network based on data of at least one of the current layer and at least one other layer of the neural network. Further, the method may include updating the operating matrix based on the computed gradients. The method may also include updating an indexing matrix of the current layer based on the updated operating matrix.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Deep learning (DL), which may also be referred to as "deep machine learning," "deep structured learning," or "hierarchical learning" is a branch of machine learning based on a set of algorithms that attempt to model high-level abstractions in data by using model architecture.

Most recent state-of-art deep learning architectures are getting bigger and deeper. The most popular architectures, such as convolutional neural networks (CNN) and long short term memory (LSTM), are end-to-end systems, which minimize human interference. However, the architectures are rarely able to change the fundamental structure of a neural network.

Training a deep neural network (DNN) is expensive, requiring multiple GPUs. Further, a common DL method paired with a common DL architecture include large number of parameters (hundreds of millions). However, the quantity of parameters in DNN has proven to be redundant. The most common DL application flow is training a DNN with high redundancy, and then downscaling the network to a smaller size. The conflict is between the requirement of large network in training and unnecessary redundancy in inference, which causes the waste of computation power and expensive dedicated hardware.

As used in the present disclosure, a "dictionary" may include any computer-readable data that includes one or more "entries" to associate one item with another. For example, a dictionary entry may associate a simple electronic message (e.g., a five bit value) with a more complex data structure (e.g., a thirty-two bit floating value). A dictionary may be queried by one of the entries (e.g., the simple electronic message) and receive as an output the correlated entry. For example, a query by a simple electronic message may result in the output of a more complex data structure and a query by a more complex data structure may result in the output of a simple electronic message.

Mapping of neural networks may include two different types of dictionaries, one type of dictionary for intermediate activations, and another type of dictionary for weights. Dictionaries for intermediate activations may be generated according to one or more embodiments disclosed herein. Weights dictionaries may be generated by offline K-means (e.g., Lloyd's algorithms).

The idea of random shared weights to reduce the requirement of memory during training has been explored. However this idea fails to develop the structure of a network, and it leads to performance being heavily dependent on initialization.

As used herein, the term "epoch" refers to an entire data set being processed once by a network, and the term "iteration" refers to each time the network processes an amount of data. One epoch may have many iterations. Further, the term "mapping" refers to a process wherein an indexing matrix is mapped to dictionary. A "stochastic gradient descent" (SGD) is an optimization method for machine learning, and a "clustering method" (e.g. k-means) is a method of receiving input data and outputting representative index and a corresponding collection of centroids.

The present disclosure relates to neural networks, which may be referred to herein as a dictionary-based, self-adaptive networks (DSN). Various embodiments may relate to DSN architectures, training algorithms, and/or training schemes. Various embodiments may resolve a conflict between a requirement of large network in training and its unnecessary redundancy in inference. Via increased flexibility, a DSN may learn to, for example, strengthen neurons, weaken neurons, and/or connect neurons.

As described more fully below, each layer of a DSN architecture may include at least one indexing matrix, which may be paired with a mapping dictionary (e.g., a multidimensional mapping dictionary). An indexing matrix may include an address indexing to particular mapping dictionary that may include a plurality (e.g. 32 or 64) of floating-point numbers.

According to one embodiment, a gradient of each centroid in a dictionary in a particular layer may be computed by summarizing the gradients from indexing positions which map to the same specific centroid. The indexing matrix may be updated by assigning the index based on clustering a temporary updated gradient matrix to the corresponding dictionary. The clustering method used for updating indexing matrix is based on selecting a closest (in distance) centroid in the dictionary.

According to another embodiment, an indexing matrix and dictionary may be generated by clustering methods (e.g. K-mean) in every iteration.

Embodiments of the present disclosure are now explained with reference to the accompanying drawings.

Figure 1:
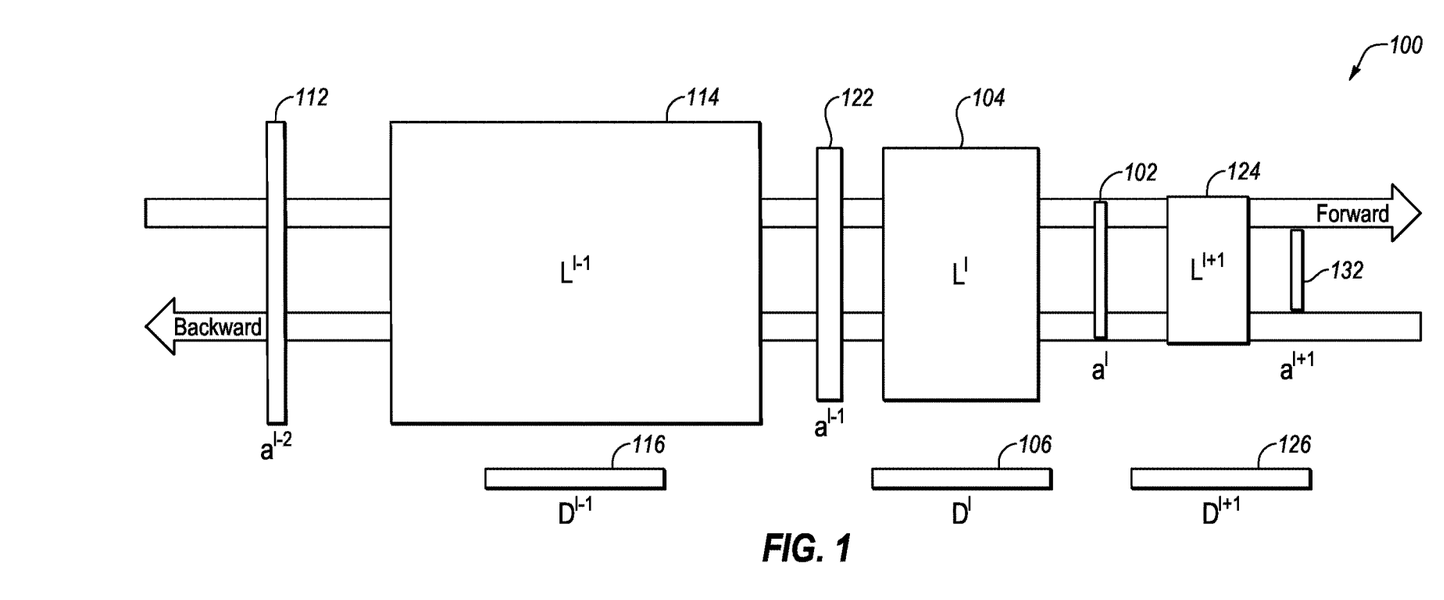
FIG. 1 illustrates a neural network system, according to an embodiment of the present disclosure.

FIG. 1 depicts one embodiment of a portion of a network 100, which may also be referred to herein as "system 100." System 100 includes an activation array $a^l$ 102 in layer l, a 2-D indexing matrix $L^l$ in layer l 104, and a mapping dictionary (1-D array) $D^l$ 106 in layer l. System 100 further includes activation array $a^{l-2}$ 112, an activation array $a^{l-1}$ 122, an activation array $a_j^{l+1}$ 132, an indexing matrix $L^{l-1}$ 114, an indexing matrix $L_1^{l+1}$ 124, a mapping dictionary $D^{l-1}$ 116, and a mapping dictionary $D^{l+1}$ 126.

It is noted that arrays L and dictionaries D can vary dimensionally, and mapping between arrays L and dictionaries D may vary based on applications. Embodiments of the present disclosure are not limited to a multi-layer perceptron (MLP) network. Rather, embodiments may be applicable to other neural networks, such as RNN, CNN.

With reference to FIG. 1, and equation (1) below, an output of a layer during a feed-forward phase may be computed. More specifically, a dedicated mapping function $D_j(L_j)$, denoting mapping from indexing matrix to a corresponding dictionary, between layer l and l+1 may be used to compute an intermediate activation array for layer l+1 via the following equation:

$$a_i^{l+1} = f\left(\sum_j^{n^l} D^l(L_{(i,j)}^l)a_j^l + b^l\right); \quad (1)$$

wherein "i" is the ith element in layer l+1 and "j" represents the element in the activation array.

As noted above, in one embodiment, a gradient of each centroid in a dictionary in a particular layer may be computed by summarizing the gradients from indexing positions which map to the same specific centroid. The indexing matrix may be updated by assigning the index based on a clustering temporary updated gradient matrix to the current corresponding dictionary. This embodiment may be referred to herein as "adaptive stochastic gradient descent."

Figure 2:
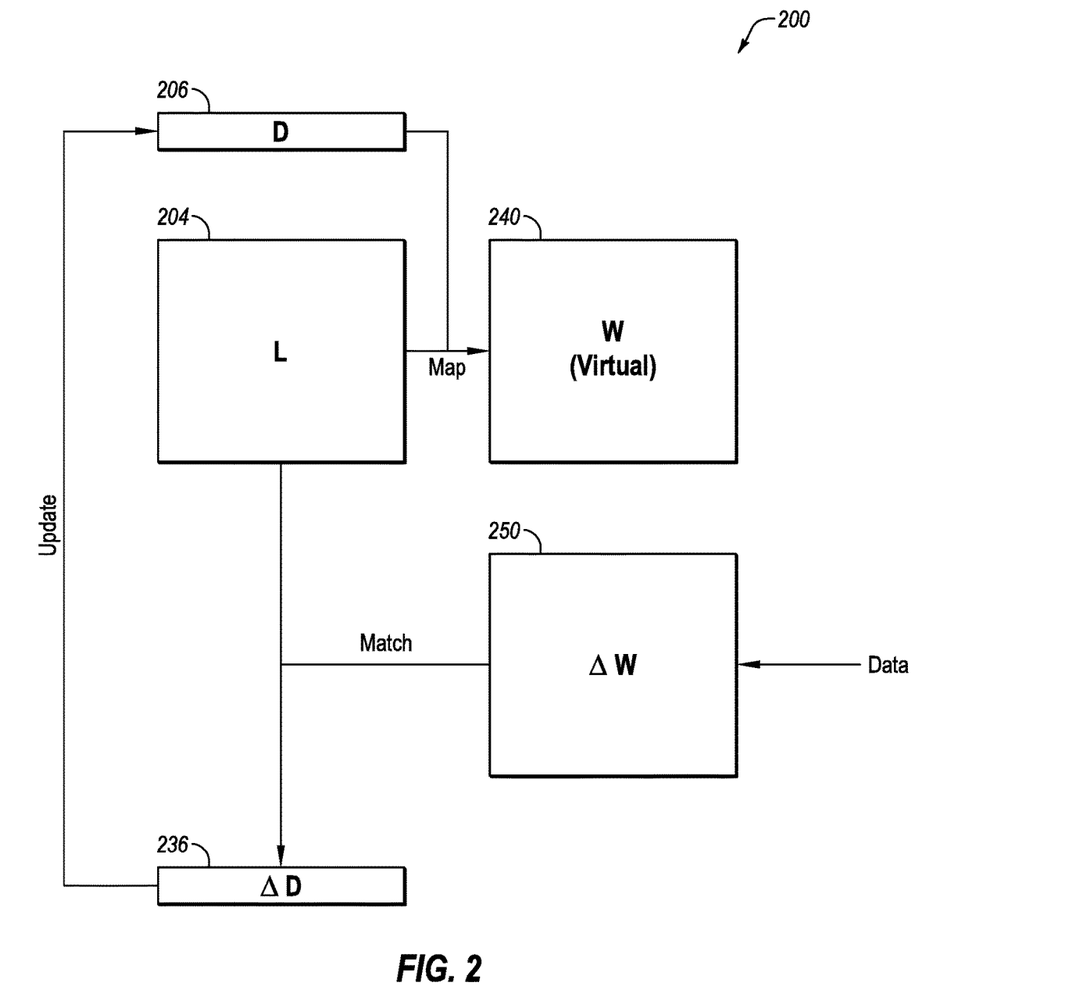
FIG. 2 illustrates an example of updating a dictionary in a layer of a neural network system.

FIG. 2 illustrates an example system 200 for a current layer including an indexing matrix 204, a mapping dictionary 206, a dictionary gradient 236, an operating matrix 240, and an operating matrix gradient 250. System 200 may be configured for updating mapping dictionary 206.

For backward gradient of dictionary computing:

$$\frac{\partial Loss}{\partial a^{last}} = \delta^{last}; \quad (2)$$

$$\frac{\partial Loss}{\partial W_{(i,j)}^l} = \delta_j^{l+1} a_i^l; \quad (3)$$

$$\delta^l = \sum_j^{n^l} W_{(i,j)}^l \delta_i^{l+1}; \quad (4)$$

$$\frac{\partial W}{\partial D_k} = \sum_{L_{(i,j)}^l = k}^{n^l} \frac{\partial Loss}{\partial W}; \quad (5)$$

wherein Loss denotes the loss function for training a neural network, $\delta^l$ denotes a propagating error from the final layer to layer l, and equation (5) may be used for updating dictionary D.

During a contemplated operation of system 200, operating matrix gradient 250 may receive data from one or more layers. More specifically, operating matrix gradient 250 may receive data from the current layer and/or other layers (e.g., previous layer, next layer, etc.), and the gradient (ΔW) may be computed. Further, indexing matrix 204 may be matched to operating matrix gradient 250 to generate dictionary gradient 236. In addition, mapping dictionary 206 may be updated according to the following equation:

$$newD_k^l = D_k^l - lr_{dict} \cdot dD_k^l; \quad (6)$$

wherein $newD_k^l$ is associated with the new dictionary, $D_k^l$ is associated with the current dictionary, $lr_{dict}$ is the learning rate, and $dD_k^l$ denotes the gradient of the dictionary, as derived in equations (2)-(5).

Further, operating matrix 240 may be updated by matching mapping dictionary 206 with indexing matrix 204.

Figure 3:
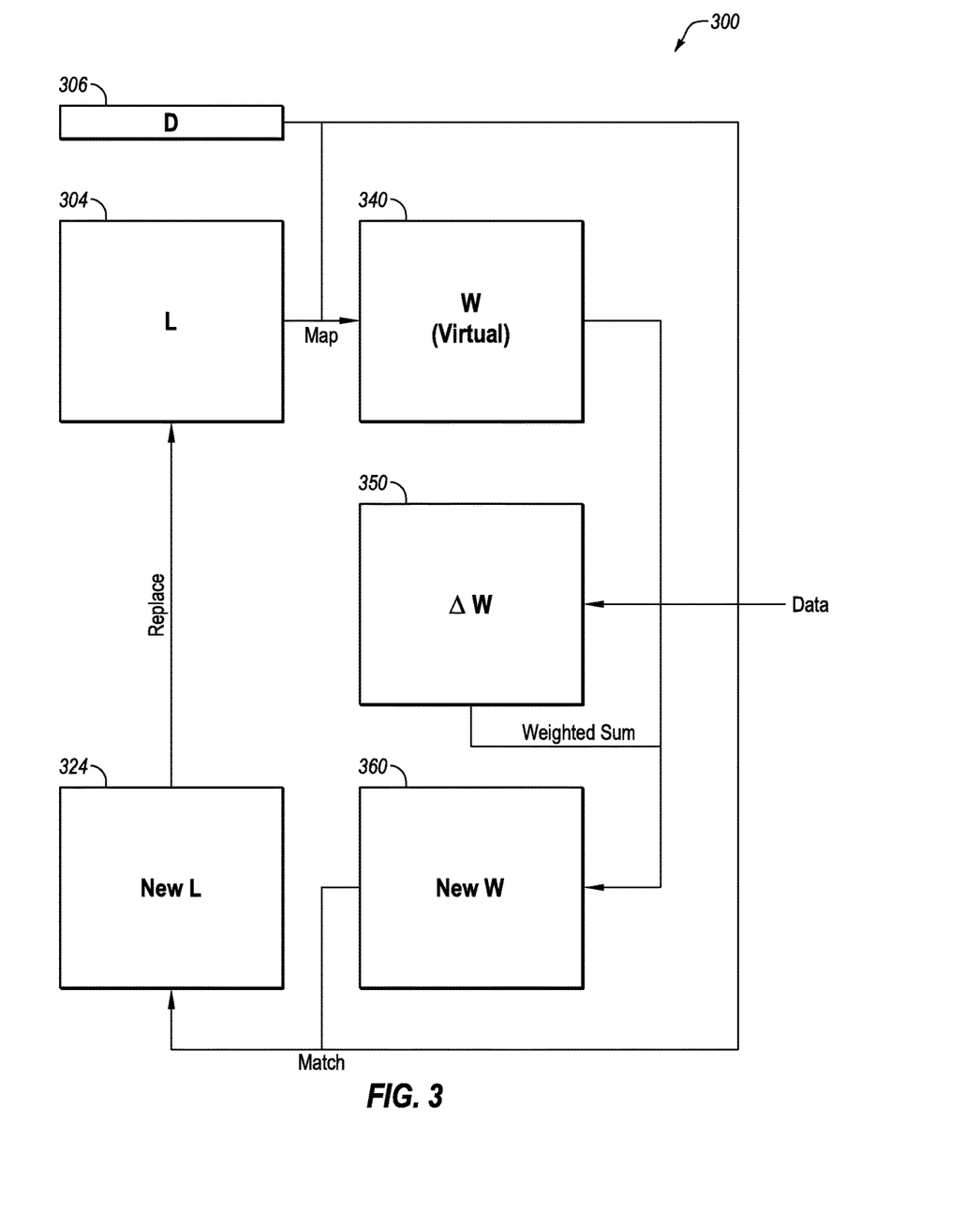
FIG. 3 depicts an example of updating an indexing matrix in a layer of a neural network system.

FIG. 3 illustrates an example system 300 for a current layer including an indexing matrix 304, a mapping dictionary 306, an operating matrix 340, an operating matrix gradient 350, a new operating matrix 360, and a new indexing matrix 324. System 300 may be configured for updating indexing matrix 304.

During a contemplated operation of system 300, operating matrix gradient 350 may receive data from one or more layers. More specifically, operating matrix gradient 350 may receive data from the current layer and/or other layers (e.g., previous layer, next layer, etc.), and gradient values (ΔW) may be computed. Further, new operating matrix 360 may be computed according to the following equations:

$$W_{(i,j)}^l = D^l(L_{(i,j)}^l); \quad (7)$$

$$newW_{(i,j)}^l = W_{(i,j)}^l - lr_{index} \cdot dW_{(i,j)}^l; \quad (8)$$

wherein $W_{(i,j)}^l$ is associated with operating matrix 340, $newW_{(i,j)}^l$ is associated with new operating matrix 360, $D^l$ is associated with mapping dictionary 306, $lr_{index}$ is the learning rate, and $dW_{(i,j)}^l$ denotes the gradient associated with operating matrix gradient 350.

In addition, new indexing matrix 324 may be generated by matching mapping dictionary 306 with new operating matrix 360 according to the following equation:

$$newL_{(i,j)}^l = matching(D^L, newW_{(i,j)}^l); \quad (9)$$

wherein $newL_{(i,j)}^l$ is associated with new indexing matrix 324, $D^l$ is associated with mapping dictionary 306, and $newW_{(i,j)}^l$ is associated with new operating matrix 360.

Equation (10) below is a representation of forward computing.

$$a_i^{l+1} = f\left(\sum_j^{n^l} W_{(i,j)}^l a_j^l + b^l\right). \quad (10)$$

Figure 4:
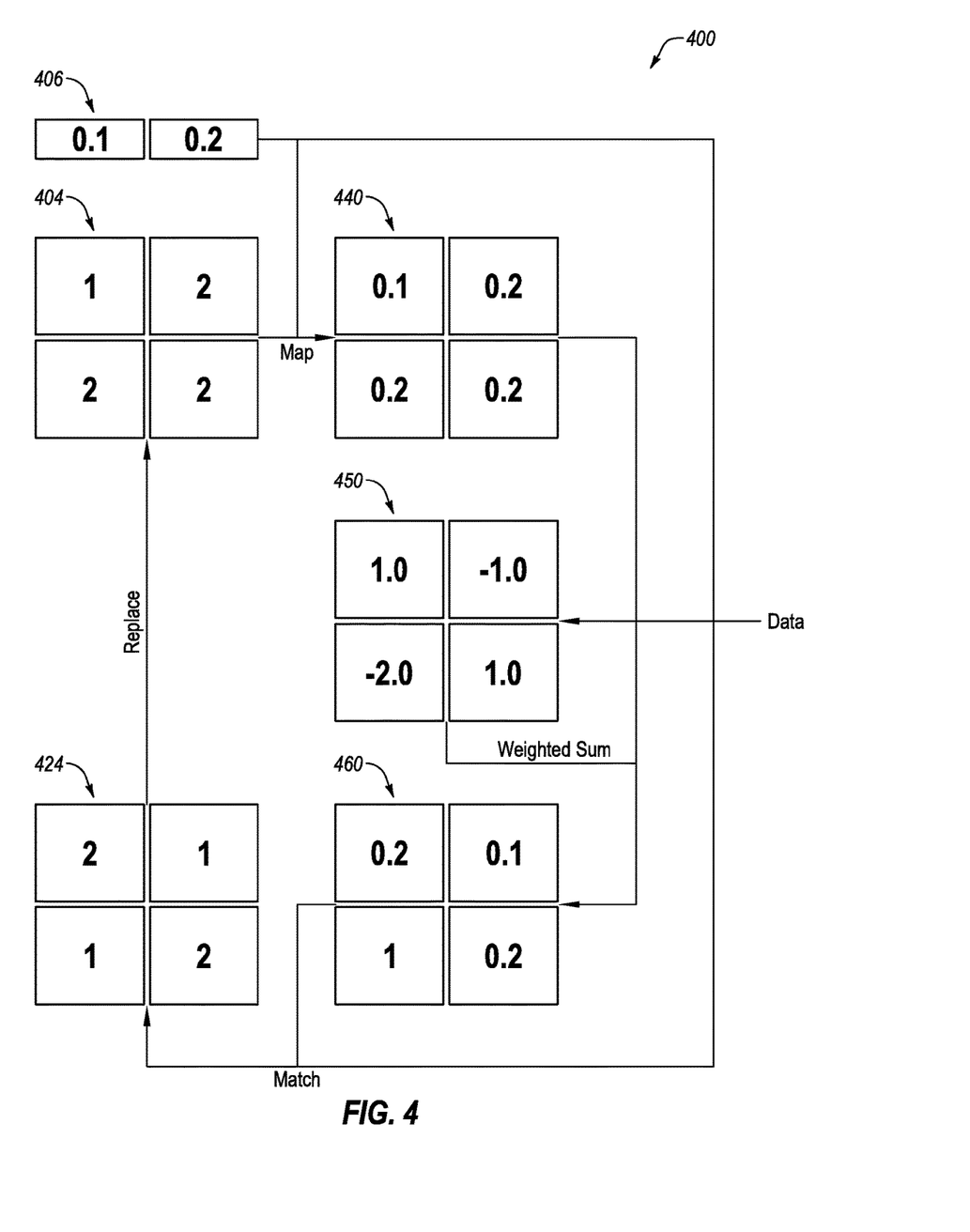
FIG. 4 illustrates another example of updating an indexing matrix in a layer of a neural network system.

FIG. 4 illustrates an example system 400 for a current layer including example values for an indexing matrix 404, a mapping dictionary 406, an operating matrix 440, an operating matrix gradient 450, a new operating matrix 460, and a new indexing matrix 424. Like system 300 (see FIG. 3), system 400 may be configured for updating an indexing matrix (e.g., indexing matrix 404).

During a contemplated operation of system 400, operating matrix gradient 450 may receive data from one or more layers. More specifically, operating matrix gradient 450 may receive data from the current layer and/or other layers (e.g., previous layer, next layer, ect.), and gradient values (ΔW) for operating matrix gradient 450 may be computed. Further, new operating matrix 460 may be computed according to the following equation:

$$W_{(i,j)}^l = D^l(L_{(i,j)}^l); \quad (11)$$

$$\text{new}W_{(i,j)}^l = W_{(i,j)}^l - lr_{index} \cdot dW_{(i,j)}^l; \quad (12)$$

wherein $W_{(i,j)}^l$ is associated with operating matrix 440, new $W_{(i,j)}^l$ is associated with new operating matrix 460, $D^l$ is mapping dictionary 406, $lr_{index}$ is the learning rate, and $dW_{(i,j)}^l$ denotes the gradient associated with operating matrix gradient 450.

In addition, new indexing matrix 424 may be generated by matching mapping dictionary 406 with new operating matrix 460 according to equation (13) below. To map dictionary 406 with new operating matrix 460, an index of each centroid in dictionary 406 may be assigned to the closest value in new operating matrix 460 to generate new indexing matrix 424.

$$\text{new}L_{(i,j)}^l = \text{matching}(D^l, \text{new}W_{(i,j)}^l); \quad (13)$$

wherein $\text{new}L_{(i,j)}^l$ is new indexing matrix 424, $D^l$ is mapping dictionary 406, and $\text{new}W_{(i,j)}^l$ is new operating matrix 460.

Figure 5:
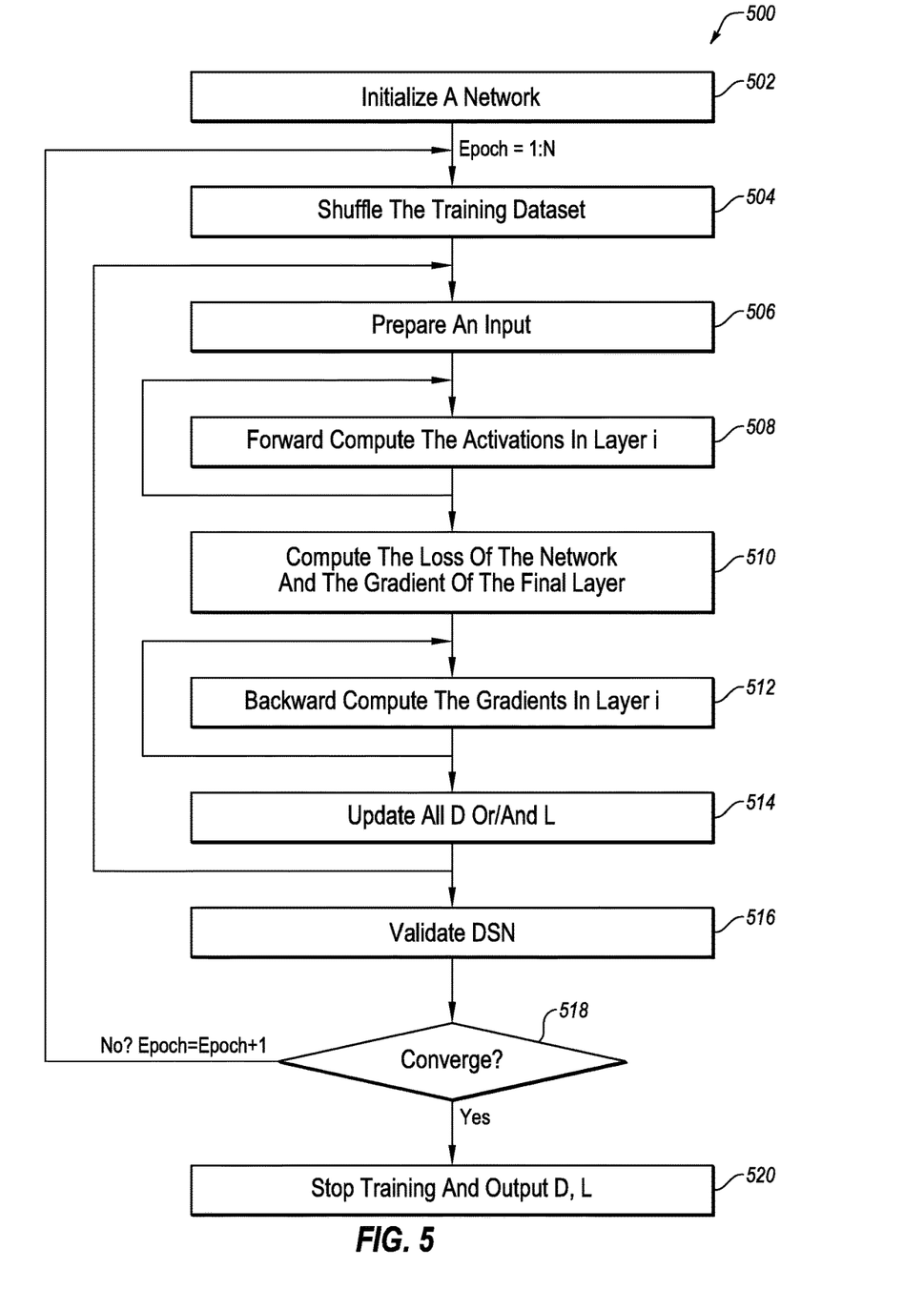
FIG. 5 is a flowchart of an example method for updating a dictionary and a indexing matrix of a neural network system.

FIG. 5 is a flowchart of an example method 500 for updating a dictionary and/or an indexing matrix in a layer of a neural network, in accordance with at least one embodiment of the present disclosure. Method 500 may be performed by any suitable system, apparatus, or device. For example, system 100 of FIG. 1 or one or more of the components thereof may perform one or more of the operations associated with method 500. In these and other embodiments, program instructions stored on a computer readable medium may be executed to perform one or more of the operations of method 500.

At block 502, a network may be initialized, and method may proceed to block 504. For example, network may comprise a dictionary-based, self-adaptive network.

At block 504, a training dataset may be shuffled, and method 500 may proceed to block 506.

At block 506, an input may be prepared, and method 500 may proceed to block 508. For example, a subset of data of the input may be selected for processing.

At block 508, activations for each element in an activation array for each layer may be forward computed. After each element in an activation array for each layer is computed, method 500 may proceed to block 510.

At block 510, a loss of the network and a gradient of a final layer may be computed, and method 500 may proceed to block 512.

At block 512, gradients in each layer may be backward computed. For example, gradients of a dictionary of each layer and a new operating matrix (e.g., new operating matrix gradient 250/350) of each layer may be computed. After gradients in each layer are computed, method 500 may proceed to block 514.

At block 514, a mapping dictionary and/or an indexing matrix for each layer maybe updated. After each mapping dictionary and/or indexing matrix for each layer is updated, method 500 may proceed to block 516.

At block 516, the network may be validated, and if performance is sufficient, method 500 may proceed to block 518.

At block 518, a determination may be made as to whether convergence exists. If it is determined that there is convergence (e.g., the dictionaries and the indexing matrices are not substantially changing), method 500 may proceed to block 520. If it is determined that there is no convergence, Epoch=Epoch+1, and method 500 may return to block 504.

At block 520, the updated dictionary and/or the updated indexing matrix may be outputted.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

In another embodiment, as noted above, an indexing matrix and a mapping dictionary may be generated via a clustering method (e.g. K-means clustering method).

Figure 6:
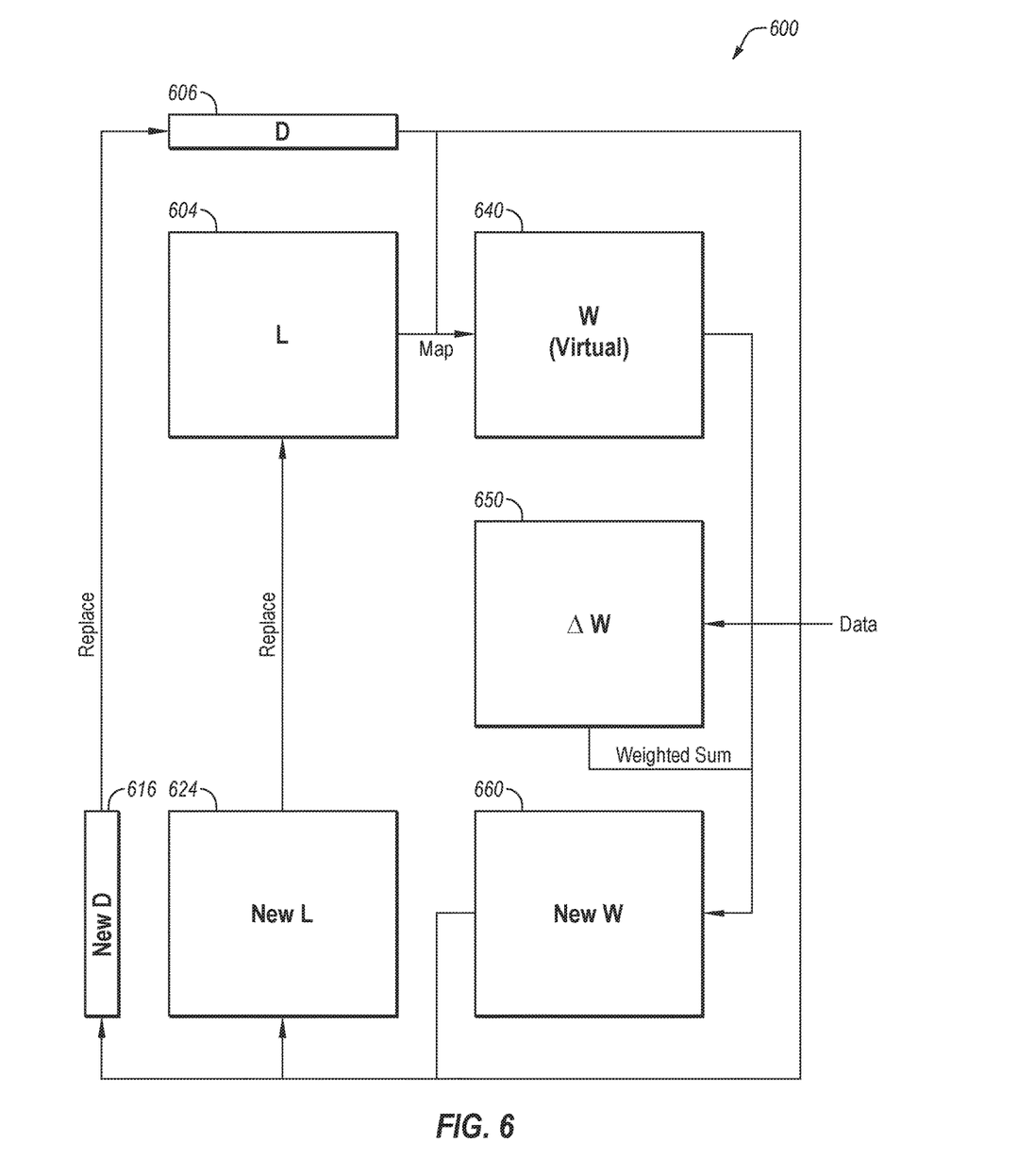
FIG. 6 depicts an example of updating a dictionary and an indexing matrix of a neural network system via a clustering method.

FIG. 6 illustrates an example system 600 for a current layer including an indexing matrix 604, a mapping dictionary 606, an operating matrix 640, an operating matrix gradient 650, a new operating matrix 660, a new indexing matrix 624, and a new dictionary 616. System 300 may be configured for updating indexing matrix 604.

During a contemplated operation of system 600, operating matrix gradient 650 may receive data from one or more layers. More specifically, operating matrix gradient 650 may receive data from the current layer and/or other layers (e.g., previous layer, next layer, ect.), and gradient values (ΔW) may be computed. Further, new operating matrix 660 may be computed according to equation (15) below. Further, new dictionary 616 and new indexing matrix 624 may be computed by performing a clustering method (e.g., k-mean clustering method) on new operating matrix 660, according to equation (16) below. Indexing matrix 604 may be replaced by new indexing matrix 624, and dictionary 606 may be replaced by new dictionary 616.

$$W_{(i,j)}^l = D^l(L_{(i,j)}^l); \quad (14)$$

$$\text{new}W_{(i,j)}^l = W_{(i,j)}^l + lr_{index} \cdot dW_{(i,j)}^l; \quad (15)$$

$$\text{new}L^l, \text{new}D^l = k\text{-means}(\text{new}W^l); \quad (16)$$

wherein $W_{(i,j)}^l$ is associated with operating matrix 640, $D^l$ is associated with mapping dictionary 606, $L_{(i,j)}^l$ is associated with indexing matrix 604, $\text{new}W_{(i,j)}^l$ is associated with new operating matrix 660, $\text{new}L_{(i,j)}^l$ is associated with new indexing matrix 624, $\text{new}D^l$ is associated with new dictionary 616, $lr_{index}$ is the learning rate, and $dW_{(i,j)}^l$ denotes the gradient associated with operating matrix gradient 650.

Figure 7:
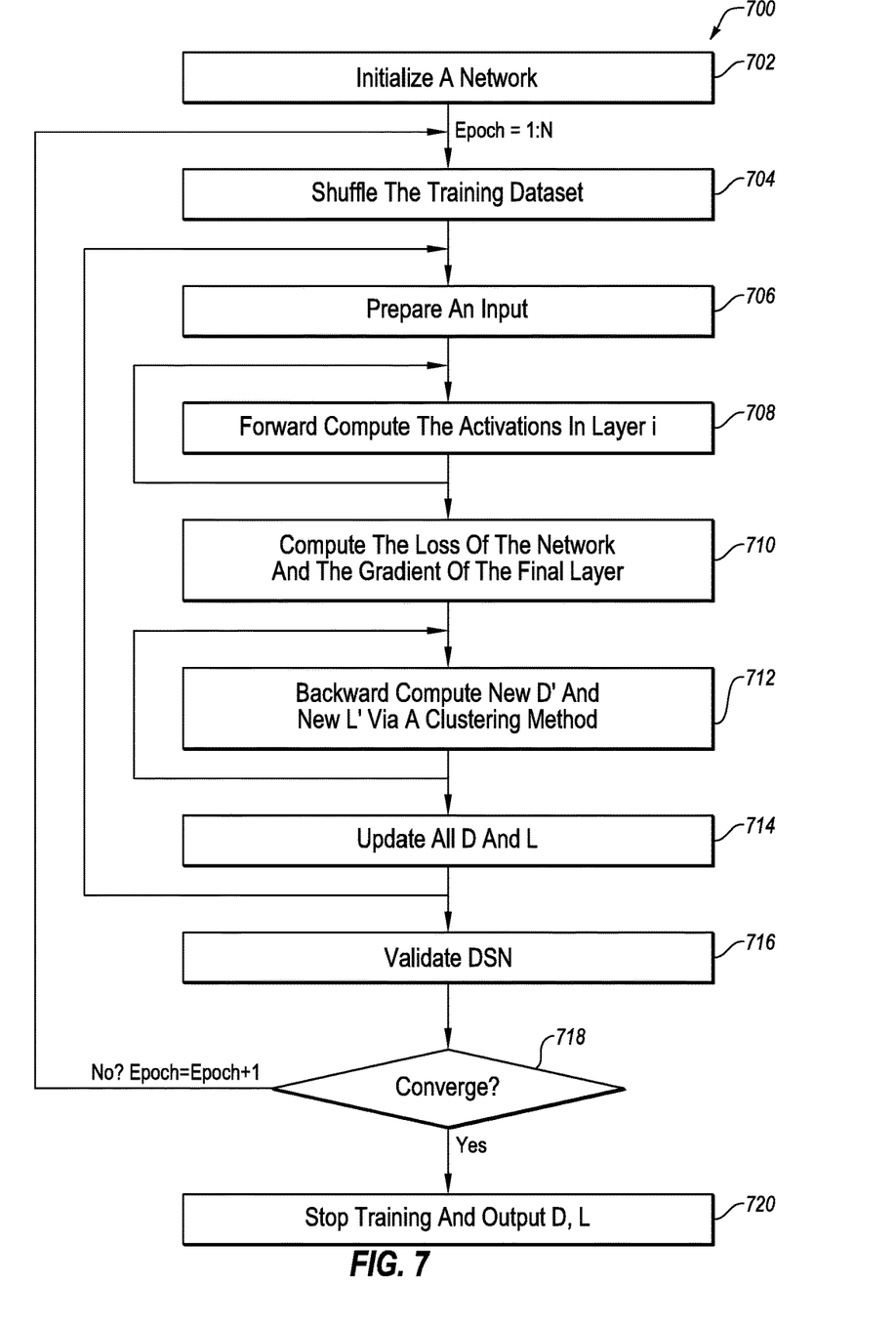
FIG. 7 is a flowchart of an example method for updating a dictionary and an indexing matrix a neural network system via a clustering method.

FIG. 7 is a flowchart of an example method 700 for updating a dictionary and/or an indexing matrix in a layer of a neural network, in accordance with at least one embodiment of the present disclosure. Method 700 may be performed by any suitable system, apparatus, or device. For example, system 100 of FIG. 1 or one or more of the components thereof may perform one or more of the operations associated with method 700. In these and other embodiments, program instructions stored on a computer readable medium may be executed to perform one or more of the operations of method 700.

At block 702, a network may be initialized, and method may proceed to block 704. For example, network may comprise a dictionary-based, self-adaptive network.

At block 704, a training dataset may be shuffled, and method 700 may proceed to block 706.

At block 706, an input may be prepared, and method 700 may proceed to block 708. For example, a subset of data of the input may be selected for processing.

At block 708, activations for each element in an activation array for each layer may be forward computed. After each element in an activation array for each layer is computed, method 700 may proceed to block 710.

At block 710, a loss of the network and a gradient of a final layer may be computed, and method 700 may proceed to block 712.

At block 712, a new dictionary and a new indexing matrix for each layer may be backward computed via a clustering method. For example, a new dictionary and a new indexing matrix (e.g., new indexing matrix 324) for each layer may be backward computed via a k-means clustering method. After a new dictionary and a new indexing matrix for each layer are computed, method 700 may proceed to block 714.

At block 714, a mapping dictionary and an indexing matrix for each layer maybe updated. After a mapping dictionary and an indexing matrix for each layer is updated, method 700 may proceed to block 716.

At block 716, the network may be validated, and method 700 may proceed to block 718.

At block 718, a determination may be made as to whether convergence exists. If it is determined that there is convergence (e.g., the dictionaries and the indexing matrices are not substantially changing), method 700 may proceed to block 720. If it is determined that there is no convergence, Epoch=Epoch+1, and method 700 may return to block 704.

At block 720, the updated dictionary and/or the updated indexing matrix may be outputted.

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 8:
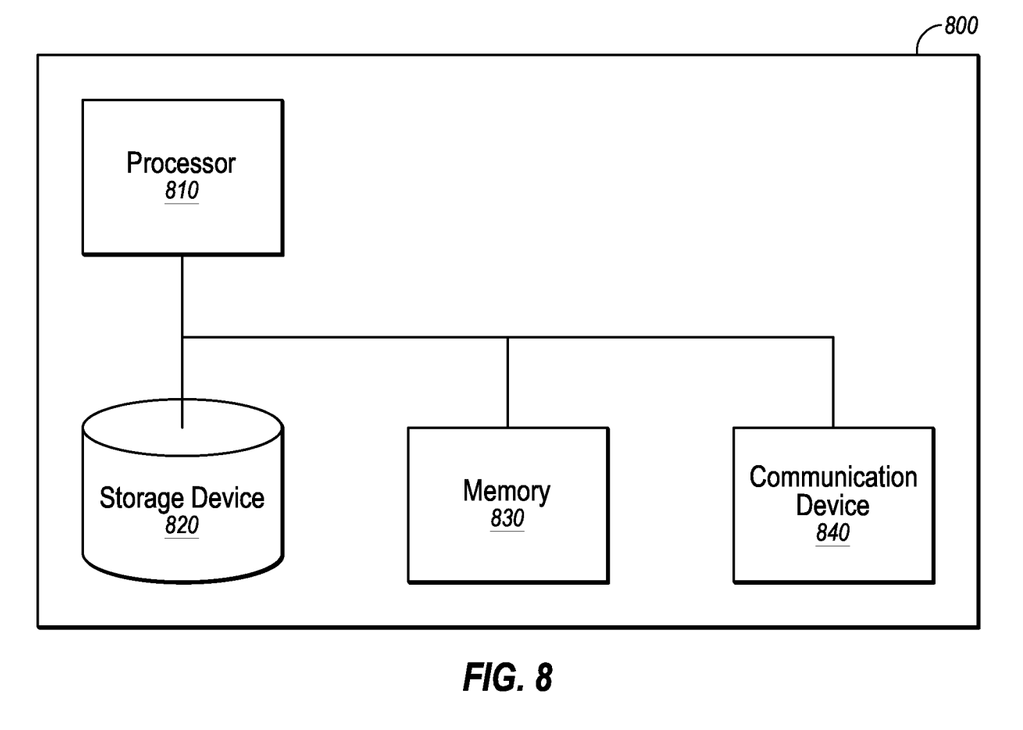
FIG. 8 is a block diagram of an example computing device.

FIG. 8 is a block diagram of an example computing device 800, in accordance with at least one embodiment of the present disclosure. For example, system 100 of FIG. 1 may be implemented as computing device 800. Computing device 800 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 800 may include a processor 810, a storage device 820, a memory 830, and a communication component 840. Processor 810, storage device 820, memory 830, and/or communication component 840 may all be communicatively coupled such that each of the components may communicate with the other components. Computing device 800 may perform any of the operations described in the present disclosure.

In general, processor 810 may include any suitable special-purpose or general-purpose computer, computing entity, or processing device including various computer hardware or software modules and may be configured to execute instructions stored on any applicable computer-readable storage media. For example, processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 8, processor 810 may include any number of processors configured to perform, individually or collectively, any number of operations described in the present disclosure.

In some embodiments, processor 810 may interpret and/or execute program instructions and/or process data stored in storage device 820, memory 830, or storage device 820 and memory 830. In some embodiments, processor 810 may fetch program instructions from storage device 420 and load the program instructions in memory 830. After the program instructions are loaded into memory 830, processor 810 may execute the program instructions.

For example, in some embodiments one or more of the processing operations of a process chain may be included in data storage 820 as program instructions. Processor 810 may fetch the program instructions of one or more of the processing operations and may load the program instructions of the processing operations in memory 830. After the program instructions of the processing operations are loaded into memory 830, processor 810 may execute the program instructions such that computing device 800 may implement the operations associated with the processing operations as directed by the program instructions.

Storage device 820 and memory 830 may include computer-readable storage media for carrying or having computer-executable instructions or data structures stored thereon. Such computer-readable storage media may include any available media that may be accessed by a general-purpose or special-purpose computer, such as processor 810. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

In some embodiments, storage device 820 and/or memory 830 may store data associated with a deep learning system. For example, storage device 820 and/or memory 830 may store encoded activation addresses, encoded weight addresses, and/or one or more dictionaries.

Communication component 840 may include any device, system, component, or collection of components configured to allow or facilitate communication between computing device 800 and another electronic device. For example, communication component 840 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication component 840 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 8 without departing from the scope of the present disclosure. For example, computing device 800 may include more or fewer elements than those illustrated and described in the present disclosure. For example, computing device 800 may include an integrated display device such as a screen of a tablet or mobile phone or may include an external monitor, a projector, a television, or other suitable display device that may be separate from and communicatively coupled to computing device 800.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of updating a neural network, comprising:
computing gradients for an operating matrix of a current layer of the neural network based on data of at least one of:
the current layer; and
at least one other layer of the neural network;
updating the operating matrix of the current layer based on the computed gradients and the operating matrix of the current layer; and
updating an indexing matrix of the current layer based on matching the updated operating matrix of the current layer and a matching dictionary of the current layer.

2. The method of claim 1, wherein the updating an indexing matrix comprises updating the indexing matrix via a clustering method.

3. The method of claim 2, wherein the updating an indexing matrix via a clustering method comprises updating the indexing matrix via a k-means clustering method.

4. The method of claim 2, further comprising updating a matching dictionary of the current layer via the clustering method and based on the updated operating matrix.

5. The method of claim 4, wherein the updating a matching dictionary of the current layer via the clustering method comprises updating the matching dictionary and the indexing matrix simultaneously.

6. The method of claim 4, wherein the updating a matching dictionary of the current layer via the clustering method comprises updating the matching dictionary via a k-means clustering method.

7. The method of claim 1, further comprising updating a matching dictionary of the current layer based on the gradients for the operating matrix and the indexing matrix.

8. The method of claim 7, wherein the updating the matching dictionary comprises:

matching the gradients for the operating matrix with the indexing matrix to compute gradients for the matching dictionary; and updating the matching dictionary based on the matching dictionary, a learning rate, and the gradients for the matching dictionary.

9. The method of claim 1, wherein the computing the gradients for the operating matrix of the current layer comprises computing the gradients for the operating matrix based on an activation array of the current layer.

10. One or more non-transitory computer-readable media that include instructions that, when executed by one or more processors, are configured to cause the one or more processors to perform operations, the operations comprising:

computing gradients for an operating matrix of a current layer of a neural network based on data of at least one of the current layer and at least one other layer of the neural network;

updating the operating matrix of the current layer based on the computed gradients and the operating matrix of the current layer; and updating an indexing matrix of the current layer based on matching the updated operating matrix of the current layer and a matching dictionary of the current layer.

11. The one or more non-transitory computer-readable media of claim 10, wherein the updating an indexing matrix comprises updating the indexing matrix via a clustering method.

12. The one or more non-transitory computer-readable media of claim 11, the operations further comprising updating a matching dictionary of the current layer via the clustering method and based on the updated operating matrix.

13. The one or more non-transitory computer-readable media of claim 12, wherein the updating a matching dictionary of the current layer via the clustering method comprises updating the matching dictionary and the indexing matrix simultaneously.

14. The one or more non-transitory computer-readable media of claim 10, the operations further comprising updating a matching dictionary of the current layer based on the gradients for the operating matrix and the indexing matrix.

15. The one or more non-transitory computer-readable media of claim 14, wherein the updating the matching dictionary comprises:

matching the gradients for the operating matrix with the indexing matrix to compute gradients for the matching dictionary; and updating the matching dictionary based on the matching dictionary, a learning rate, and the gradients for the matching dictionary.

16. A system for updating a neural network, comprising:
a plurality of layers, each layer of the plurality of layers including at least one storage device and a processing element, each processing element configured to:

compute gradients for an operating matrix of a current layer based on data of one or more layer of the plurality of layers;

update the operating matrix of the current layer based on the computed gradients and the operating matrix of the current layer; and update an indexing matrix of the current layer based on matching the updated operating matrix of the current layer and a matching dictionary of the current layer.

17. The system of claim 16, wherein each processing element is further configured to update the indexing matrix via a clustering method.

18. The system of claim 17, wherein each processing element is further configured to update a matching dictionary via the clustering method and based on the updated operating matrix.

19. The system of claim 16, wherein each processing element is further configured to update a matching dictionary based on the gradients for the operating matrix and the indexing matrix.

20. The system of claim 19, wherein each processing element is further configured to:

match the gradients for the operating matrix with the indexing matrix to compute gradients for the matching dictionary; and update the matching dictionary based on the matching dictionary, a learning rate, and the gradients for the matching dictionary.

* * * * *